United States Patent
Mouko et al.

(10) Patent No.: US 6,678,732 B1
(45) Date of Patent: Jan. 13, 2004

(54) DYNAMIC HOST CONFIGURATION PROTOCOL SERVER FOR ALLOCATING IP ADDRESSES TO A PLURALITY OF CLIENTS

(75) Inventors: Yasuhiko Mouko, Yokohama (JP); Hitoshi Ikeda, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/301,878

(22) Filed: Apr. 29, 1999

(30) Foreign Application Priority Data

Aug. 10, 1998 (JP) .......................................... 10-226146

(51) Int. Cl.[7] .............................................. G06F 15/16
(52) U.S. Cl. ........................ 709/227; 709/203; 709/237
(58) Field of Search ................................ 709/227, 235, 709/237, 250, 225; 713/201, 203

(56) References Cited

U.S. PATENT DOCUMENTS

| | | | | |
|---|---|---|---|---|
| 5,764,906 A | * | 6/1998 | Edelstein et al. | 713/201 |
| 5,884,024 A | * | 3/1999 | Lim et al. | 395/187.01 |
| 5,974,453 A | * | 10/1999 | Andersen et al. | 709/220 |
| 6,073,178 A | * | 6/2000 | Wong et al. | 709/229 |
| 6,170,061 B1 | * | 1/2001 | Beser | 713/201 |
| 6,189,033 B1 | * | 2/2001 | Jin et al. | 709/225 |

FOREIGN PATENT DOCUMENTS

| | | |
|---|---|---|
| JP | 5-28065 | 2/1993 |
| JP | 9-135261 | 5/1997 |
| JP | 9-282259 | 10/1997 |
| JP | 10-13443 | 1/1998 |

* cited by examiner

*Primary Examiner*—Zarni Maung
(74) *Attorney, Agent, or Firm*—Katten Muchin Zavis Rosenman

(57) ABSTRACT

A DHCP server, to which only specified DHCP servers send DHCPOFFER message for DHCPDISCOVER message sent from DHCP clients, is provided. Plural clients and plural servers are connected to a transmission control protocol/Internet Protocol (TCP/IP) network on a LAN and the server allocates an IP address to each client by using a dynamic host configuration protocol (DHCP) at the servers. A client broadcasts an IP address lease information, which a client wants to obtain from the client. Each of the servers checks whether or not the host name of the client who sent the IP address lease information is coincident with one of host names registered in a host management database. As the result, when both of the host names are coincident, the lease information is broadcasted from the server, and therefore, the client sending the IP address lease information unicasts an IP address request to the server, and the server receiving the IP address request unicasted from the client unicasts an IP address attaching confirmation to the client.

12 Claims, 17 Drawing Sheets lease information request (DHCPDISCOVER)

lease information transmission (DHCPOFFER)

DHCP server selection (DHCPREQUEST)

Acknowledgment from DHCP server (DHCPACK)

Format of a DHCP message

Dynamic Host Configuration Protocol

FIG. 13

| Value | Message Type |
|-------|--------------|
| 1 | DHCPDISCOVER |
| 2 | DHCPOFFER |
| 3 | DHCPREQUEST |
| 4 | DHCPDECLINE |
| 5 | DHCPACK |
| 6 | DHCPNAK |
| 7 | DHCPRELEASE |

| Code | Len | Type |
|------|-----|------|
| 53 | 1 | 1-7 | lease information request (DHCPDISCOVER)

lease information transmission (DHCPOFFER)

DHCP server selection (DHCPREQUEST)

Acknowledgment from DHCP server (DHCPACK)

DYNAMIC HOST CONFIGURATION PROTOCOL SERVER FOR ALLOCATING IP ADDRESSES TO A PLURALITY OF CLIENTS

BACKGROUND OF THE INVENTION

1. Field of the Invention

The present invention relates to a dynamic host configuration protocol (DHCP) server, which dynamically allocates IP addresses to client devices, to which host names are given, connected to a Transmission Control Protocol/Internet Protocol (TCP/IP) network, and an IP address allocating method using the same.

2. Description of the Related Art

Variety of recent network systems require to make settings and management in the TCP/IP network simple and further require to effectively allocate short IP address resources.

Therefore, the Internet Engineering Task Force (IETF) has standardized the Dynamic Host Configuration Protocol (DHCP).

When plural hosts, i.e., clients for a DHCP server, concurrently access to one network, for example, messages broadcasted between the DHCP clients and the DHCP server are increased before allocating IP addresses. That also causes increasing of traffic loads, which are required to be avoided.

FIGS. 14 to 17 show operations between the DHCP clients and the DHCP servers when plural DHCP servers are provided on one TCP/IP network till a client "a" obtains an IP address.

Before the IP address is allocated by the DHCP function, the DHCP client "a" can not unicast, i.e., send a request signal for a specified server because there is no IP address. Therefore, it becomes possible to facilitate communications by broadcasting, i.e., sending arequest signal for all servers.

In FIGS. 14 to 17, "a" to "e" respectively denote standard DHCP clients, and "A" to "D" respectively denote standard DHCP servers.

At first, the client "a" broadcasts a DHCPDISCOVER message including lease information that the client "a" wants to obtain, i.e., IP address, sub-net mask and so on, to the DHCP servers "A" to "D" with the own media access control (MAC) address (refer to FIG. 14). A sub-net mask is an address obtained by that a host address is divided into plural small networks or sub-networks.

Secondly, the DHCP servers "A" to "D", which receive the DHCPDISCOVER message, respectively broadcast the requested lease information with a DHCPOFFER message.

The DHCPOFFER message includes a MAC address of the client "a" that has requested the lease information. Therefore, the client "a" acknowledges the massage is addressed to himself after then (refer to FIG. 15).

Next, the client "a" collects DHCPOFFER messages during a certain interval, selects one from the plural messages, and broadcasts the server ID or the required information value, i.e., which IP address leased from a DHCP server is used, as a DHCPREQUEST message (refer to FIG. 16).

Then, the DHCP server A decides the IP address when the leased IP address is idle, and unicasts a DHCPACK message, i.e., an acknowledging message, to the client "a" (refer to FIG. 17).

However, as all of the hosts A to D connected to one network require the above-described operations, the number of calls of the broadcasted messages increases. That causes an increase of traffic load according to the following conditions;

where there are many hosts connected to one network, and plural DHCP servers; and timings when clients allocate IP addresses are overlapped.

This causes a problem such that the broadcasted messages are increased before allocating the IP addresses, if the number of hosts and DHCP servers, each of which becomes a DHCP client connected to the TCP/IP network, becomes large.

SUMMARY OF THE INVENTION

Accordingly, it is an object of the present invention to provide a DHCP server system, in which only a specific DHCP server sends a DHCPOFFER message for a DHCPDISCOVER message sent from a DHCP client.

It is another object of the present invention to provide an IP address allocating method using the above-described DHCP server system.

The above-described objects can be attained by a DHCP server according to the present invention, by using an IP address allocating method, by which a server allocates an IP address to each client who is one of plural clients connected to a transmission control protocol/Internet protocol (TCP/IP) network on a LAN, by using a dynamic host configuration protocol (DHCP).

The client broadcasts an IP address lease information, which a client wants to obtain from the client.

The server checks whether or not the host name of the client who sent the IP address lease information is coincident with one of host names registered in a host management database.

Then, the server broadcasts a temporally allocated IP address when both of the host names are coincident, the client sending the IP address lease information unicasts an IP address request to the server, the server receiving the IP address request unicasted from the client unicasts an IP address attaching confirmation to the client.

The host management database registers host names of the plural clients, and the sent host name is checked by comparing the host name sent from the client with the registered host names to confirm whether or not any one of the registered host names is perfectly coincident to the host name sent by the client.

The host management database stores a part of each of the plural host names of the clients as registered data, and checks whether or not a part of the host name sent by the client is coincident with any one of the stored parts of the plural host names.

Further, other objects of the present invention will become clear by the description for explaining embodiments according to the attached drawings.

BRIEF DESCRIPTION OF THE DRAWINGS

FIG. 13 is an explanatory diagram of a message type, which is one part of the optional information of FIG. 12.

DESCRIPTION OF THE PREFERRED EMBODIMENTS

Figure 1:
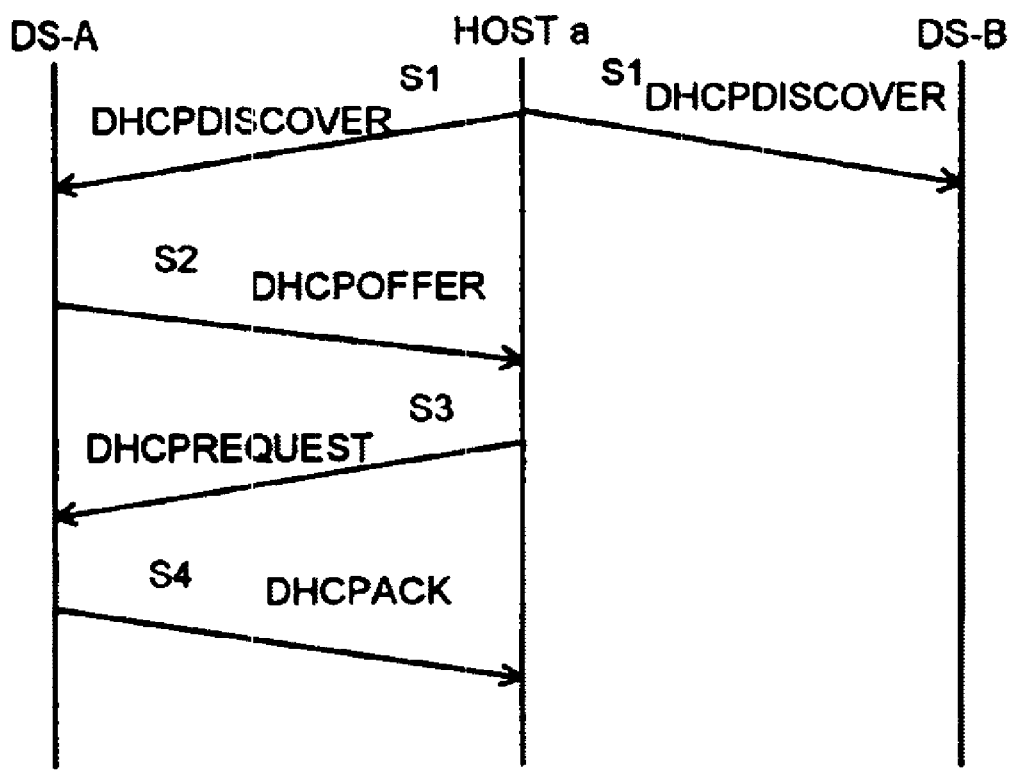
FIG. 1 shows a sequential flow chart, which explains a principle of the present invention.

Throughout the following descriptions, the same reference numerals or symbols are used to denote and identify corresponding or identical components.

Figure 2:
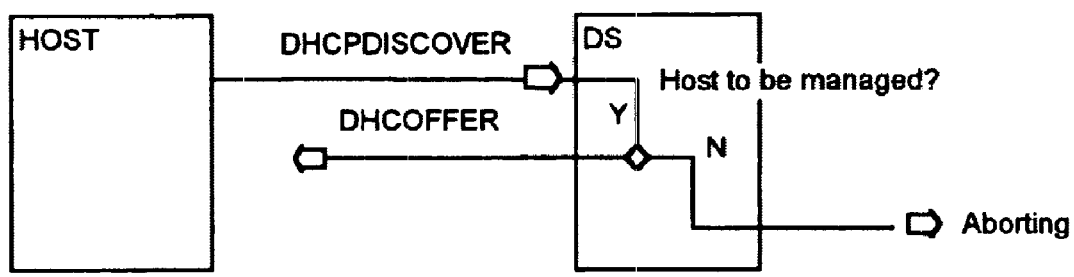
FIG. 2 is an explanatory diagram of an operation for receiving a message from the server shown in FIG. 1.

FIG. 1 is a sequential flow chart for explaining a principle of the present invention. FIG. 2 is an explanatory diagram of the message receiving operation at the server corresponding to FIG. 1. Further, FIGS. 3 to 6 show statuses corresponding to the sequential flow chart of FIG. 1.

Figure 3:
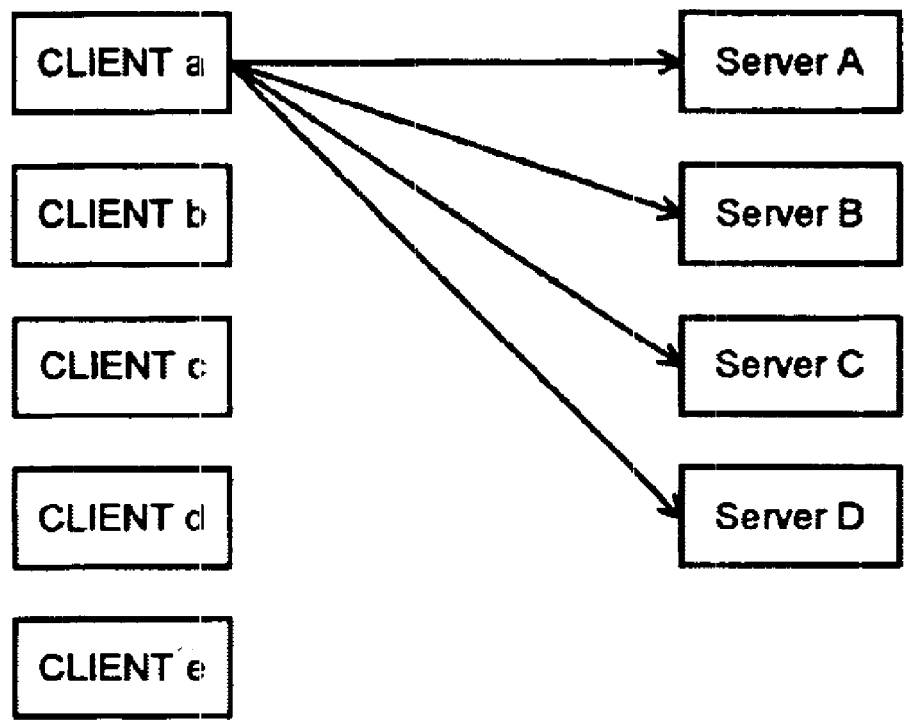
FIG. 3 is a diagram illustrating status when requesting lease information, i.e., DHCPDISCOVER message.

In FIG. 1, a host "a", which is a client for servers, broadcasts a DHCPDISCOVER message, to which lease information to be obtained, i.e., IP address, sub-net mask and so on, is attached, to DHCP servers (they are shown by servers DS-A and DS-B in FIG. 1) (STEP S1: refer to TS FIG. 3).

In opposite to that, as shown in FIG. 2, when receiving the DHCPDISCOVER message, each server judges whether or not the host (client) "a" is to be managed at the own server. If the host is not to be managed at the own server, the server aborts the DHCPDISCOVER message. When it should be managed at the own server, the server attaches the lease information with the DHCPOFFER message, and broadcasts it (STEP S2: refer to FIG. 4).

Therefore, the client "a" unicasts the DHCPREQUEST message to the DHCP server DS-A returning a reply (STEP S3: refer to FIG. 5). In response to that, the DHCP server DS-A decides the IP address as the leased IP address, and unicasts the DHCPACK message to the client "a" (STEP S4: refer to FIG. 6).

In the present invention, as each server judges whether or not the host or client should be managed at the own server, it is avoided that all servers return replies for the DHCP-DISCOVER message. Therefore, the above-described problem such that a number of the broadcasted messages increases before allocating the IP address can be solved.

Figure 7:
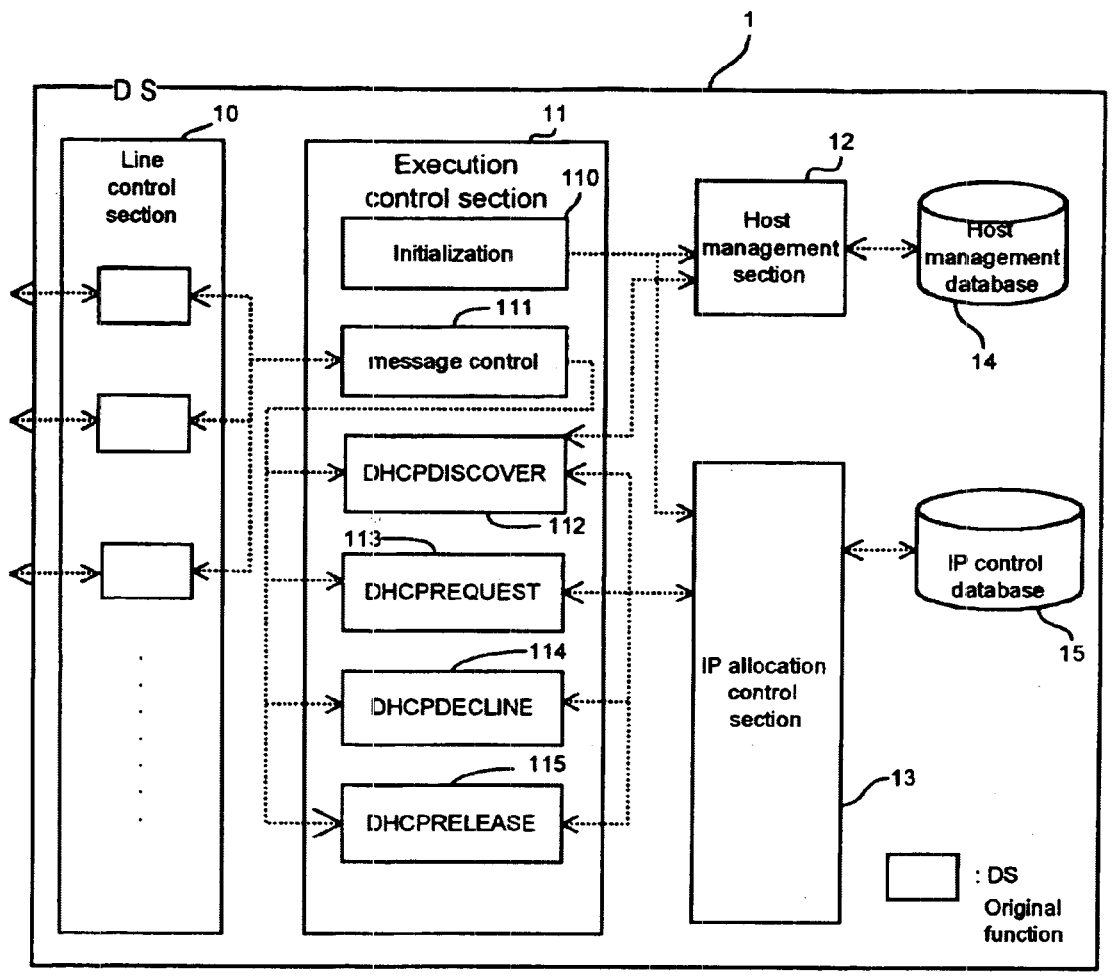
FIG. 7 is a structural block diagram of an embodiment of the DHCP server according to the present invention.
Figure 8:
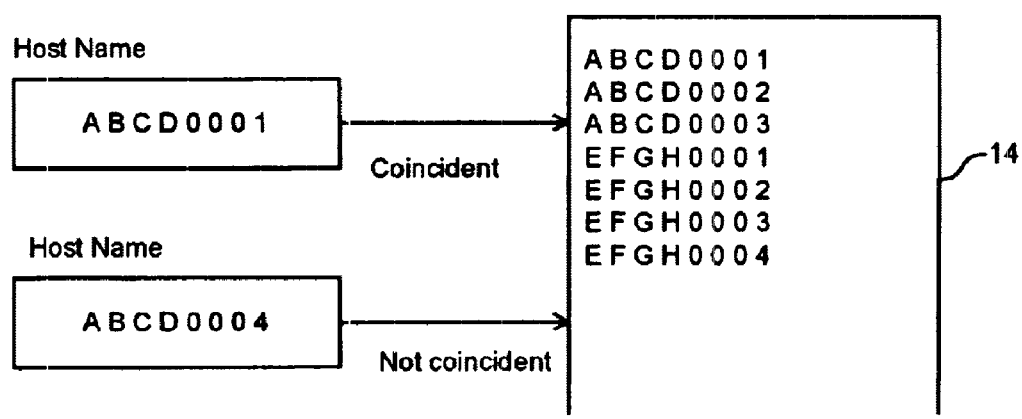
FIG. 8 is one example of a data image, i.e., a host name, of a host management database.

FIG. 7 is a structural block diagram of an embodiment of a DHCP server of the present invention. FIG. 8 is an operational flow chart of the server (DS) 1. A basic structure of a DHCP server 1 is a computer. The server of the preset invention realizes a line control section 10, an execution control section 11, a host management section 12, and an IP allocation control section 13 under the control by software executed in a CPU.

Further, the server 1 includes a host management database 14 and an IP control database 15.

Figure 11:
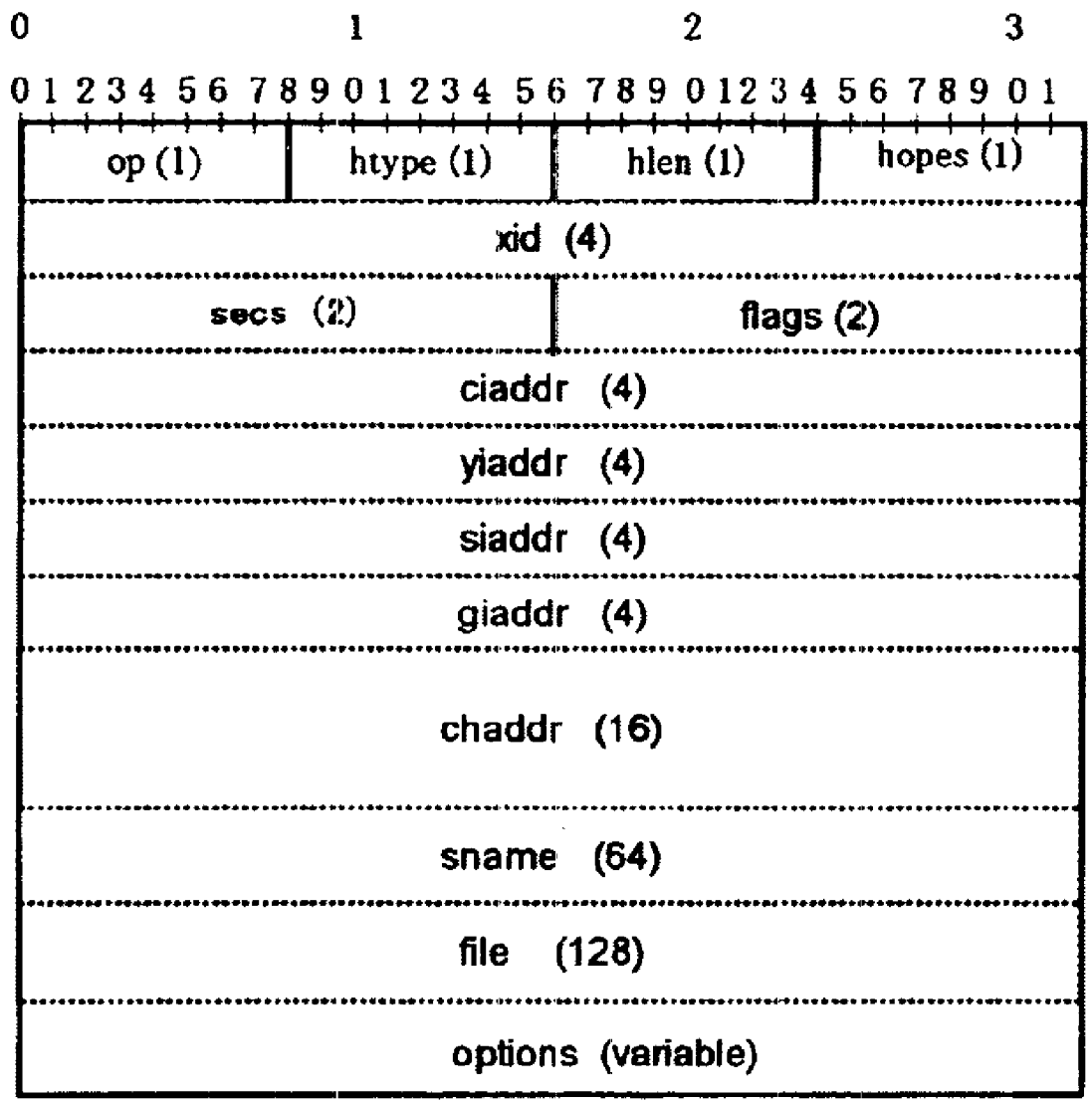
FIG. 11 is an explanatory diagram of a format of a DHCP message.

In this example, a content of the DHCP message is explained, which is received and transmitted between the server DS and the client, i.e., (host). FIG. 11 shows an format of the DHCP message. Each field, the size (expressed by octets) and the content will be expressed as follows:

TABLE 1

DHCP message format

| Field | Octet | Descpriton |
|---|---|---|
| op | 1 | message OP code/message type<br>1 = BOOTREQUEST, 2 = BOOTREPLY |
| htype | 1 | Hardware address format<br>Example: '1' = 10 mb ethernet |
| hlen | 1 | Hardware address length (Example: '6' for 10 mb ethernet) |
| hops | 1 | Client sets to zero. When starting up through an agent, a repeating agent uses it |
| xid | 4 | Processing unit ID, randomly selected by a client used by a client because a message and a response are united between a client and a server |
| secs | 2 | Embedded by a client an elapsed time (expressed by seconds) from the time of obtaining an address or the time of starting updating |
| flags | 2 | Flag |

TABLE 2

DHCP message format (continued from the table 1)

| Field | Octet | Description |
|---|---|---|
| ciraddr | 4 | Client IP address; fulfilled when the client is in the status of BOUND, RENEW and REBINDING. This address is corresponding to an ARP request |
| yiaddr | 4 | 'your' (client) IP address |

TABLE 2-continued

DHCP message format (continued from the table 1)

| Field | Octet | Description |
| --- | --- | --- |
| siaddr | 4 | IP address of the next server used at a boot status; replied with a DHCPOFFER or DHCPACK message by a server |
| giaddr | 4 | IP address of the repeating agent; used as an embodiment of booting through the repeating agent |
| chadd | 16 | Hardware address of the client |
| sname | 64 | Host name of the optional server |
| file | 128 | Boot file name; a "generic" name with DHCPDISCOVER or invalid. It becomes a complete directory path name with DHCPOFFER. |
| options | variable | Optional parameter field |

Figure 12:
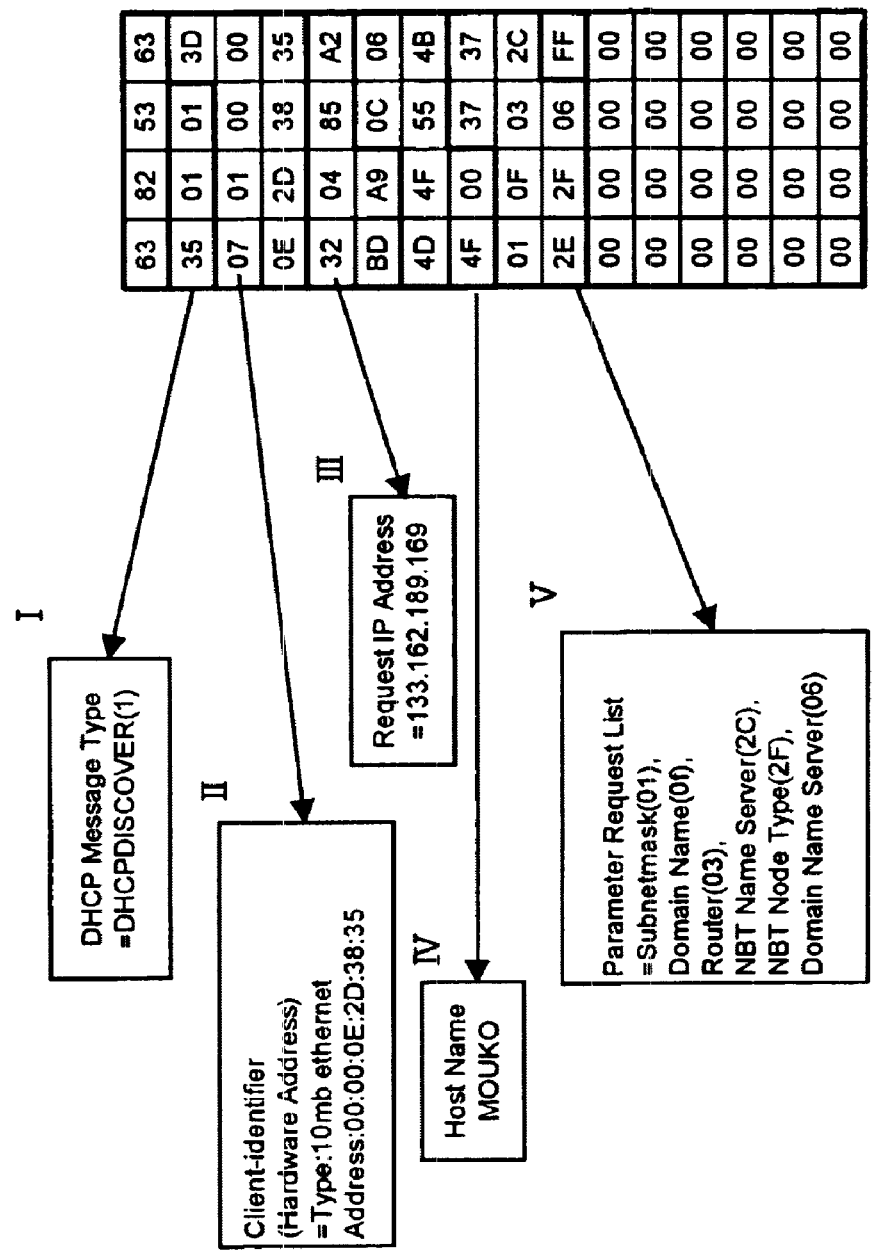
FIG. 12 is an explanatory diagram of one example of optional information in the format of the DHCP message of FIG. 11.
Figure 14:
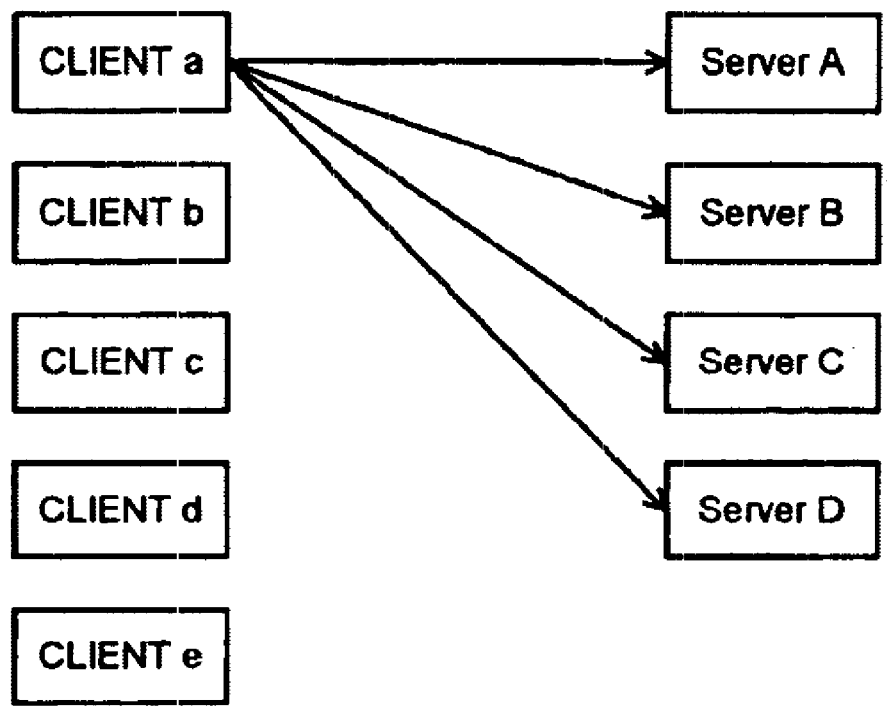
FIG. 14 illustrates status when requesting lease information, i.e., DHCPDISCOVER message, in the conventional DHCP server.
Figure 15:
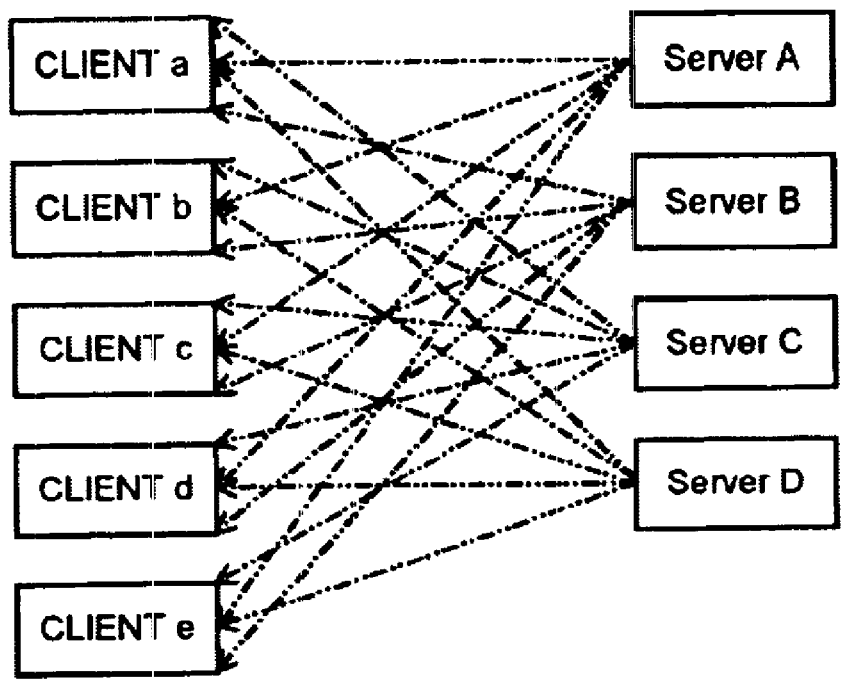
FIG. 15 illustrates status when requesting the lease information, i.e., DHCPOFFER message, in the conventional DHCP server.
Figure 16:
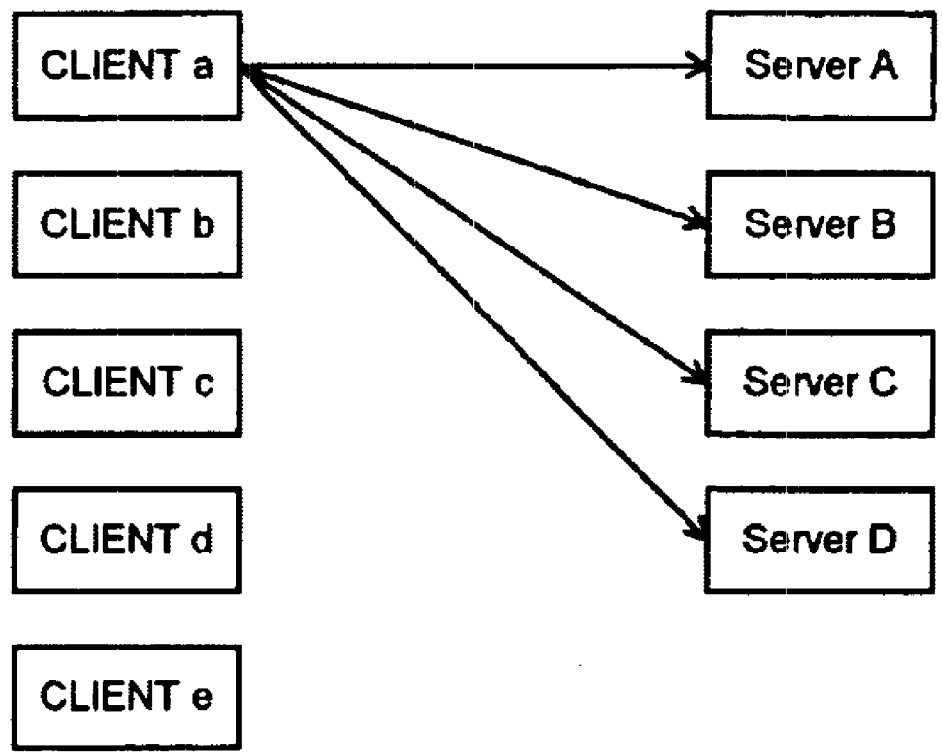
FIG. 16 illustrates status when selecting the DHCP server in the DHCP conventional server.
Figure 17:
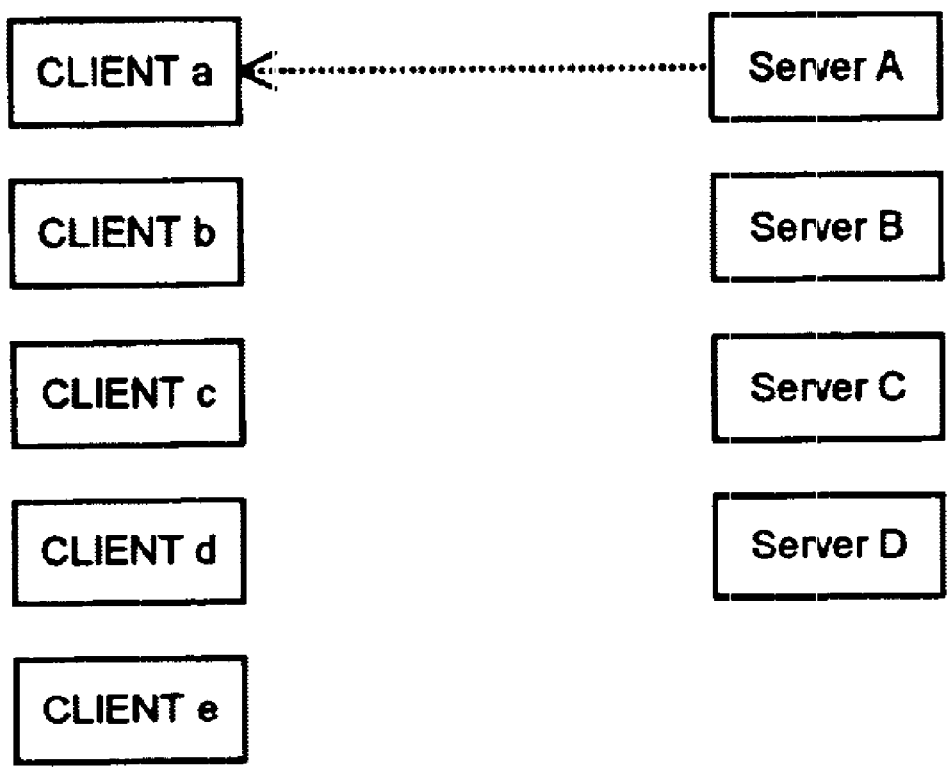
FIG. 17 illustrates a status when acknowledging from the DHCP server, i.e., DHCPACK message, in the conventional DHCP server.

In the present invention, the format of a DHCP message includes a variable optional parameter field (options) to inform the message type. FIG. 12 shows an example of a data field of the optional parameter area (options). "I" means a DHCP message type, which is expressed by hexadecimal numbers. "H", means a client identifier, i.e., hardware address, "III" means a request IP address, "IV", means a host name. Further, "V" is a parameter request list.

FIG. 13 is an example of an indication showing settable DHCP message types I. This format contains code, length and type, and each message type is expressed by one of 1 to 7 values.

Returning back to FIG. 7, a standard DHCP server includes a line control section 10, which interfaces with the other DHCP clients.

A standard DHCP server further includes an execution control section 11. The execution control section 11 performs processing the DHCP messages at the above-described steps for allocating IP addresses, which are explained in FIGS. 14 to 17. The execution control section 11 includes an initialization section 110, a message control section 111, a DHCPDISCOVER control section 112, a DHCPREQUEST control section 113, a DHCPDECLINE control section 114, and a DHCPRELEASE control section 115. In this example, the DHCPDECLINE control section 114 sends a DHCPDECLINE message and executes the processes from the first step, again, when a problem occurs.

A standard DHCP server also includes an IP allocation control section 13, which controls a database when allocating the IP address.

Figure 9:
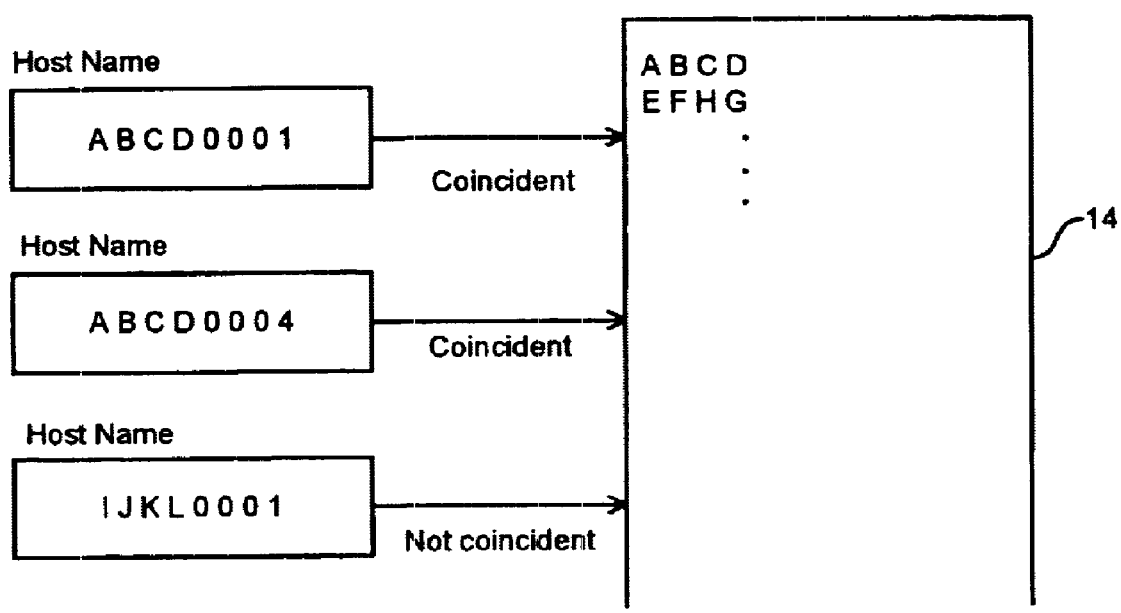
FIG. 9 is one example of a data image, i.e., one part of the host name, of the host management database.

A host management section 12 is provided on a standard DHCP server according to the present invention. The host management section 12 manages names of the hosts managed by the DHCP server. Examples of a host management database 14 are shown in FIGS. 8 and 9. The host management database 14 registers and stores the names of the hosts (clients) managed by the server.

In one example of FIG. 8, the host management database 14 registers and stores a host name, for example, ABCD0001, as it is. In other example of FIG. 9, the host management database 14 stores a part of the host name, for example, ABCD, as a registered host name. Therefore, as described later, in the example of FIG. 8, the host management database 14 confirms whether or not any host name is perfectly coincident with the sent host name, while the example of FIG. 9, in which the management database 14 confirms whether or not any part of the host name is coincident with that of the sent host name.

Figure 10:
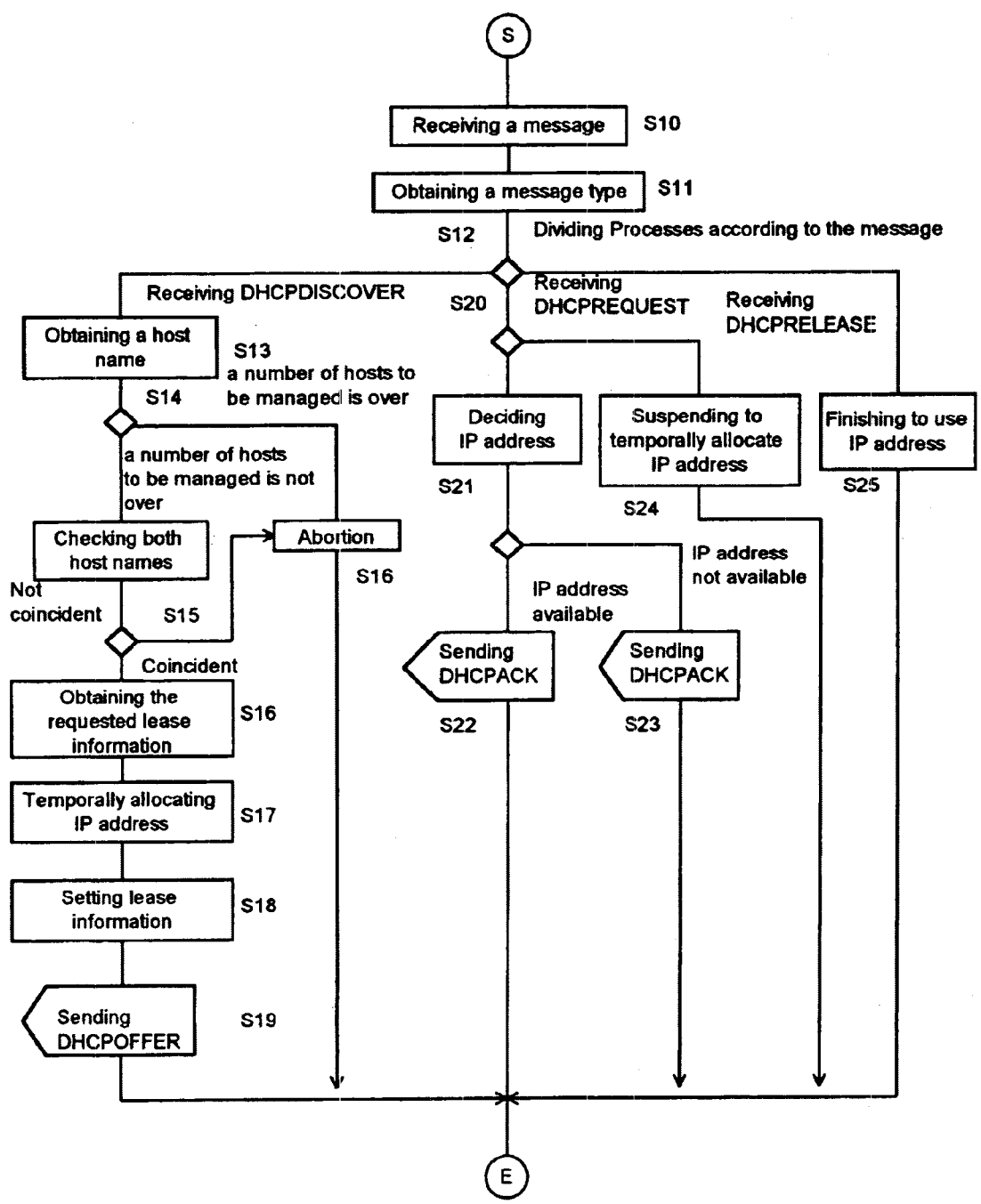
FIG. 10 shows an operational flow chart of the DHCP server shown in FIG. 7.

An embodiment of the operations when a client "a" obtains an IP address between DHCP clients and DHCP servers having the structure of the present invention will be now explained. FIG. 10 is an operational flow chart of an embodiment of the server. The operations will be explained in accompanying with diagrams illustrating statuses shown in FIGS. 3 through 6.

Lease Information Request

The client "a" sends a DHCPDISCOVER message, to which lease information the client "a" wants to obtain is attached, to the servers. It is indispensable to define the host name of the client "a" in an option area of this message (refer to FIG. 3).

Lease Information Transmission

At first, a server receives the message from the client "a" (STEP S10), and obtains a message type explained in FIG. 13 (STEP S11). Then, the server divides the processes according to the obtained message type (STEP S12). The received message type is a DHCPDISCOVER message, to which the lease information is attached, for example. Then, the server can obtain the host name defined in an option area of the DHCPDISCOVER message (STEP S13).

The server checks up the host management database 14, in which the names of the hosts managed by the server set when it boots up, whether or not the same host name exists (STEP S15). As is explained according to FIGS. 8 and 9, the host management database 14 checks and compares the sent host name with host names registered in the host management database 14.

Before comparing both host names, the server checks whether or not a number of the clients who send DHCP-DISCOVER messages is more than a prescribed number stored in the management host of the server (STEP S14 in FIG. 10). When the number of the clients is more than the prescribed number, abortion process is performed (STEP S16).

When both of the host names are coincident at the comparison, the requested lease information can be obtained (STEP S16). In other words, when both of the host names are coincident, it is judged that the message is received from one of the hosts managed by the server.

Therefore, when the message sent from the host managed, i.e., server A, is received, the requested lease information can be obtained as the same as the case of the standard DHCP servers (STEP S16), an IP address is temporally allocated (STEP S17), and the obtained lease information is set (STEP S18). Then, DHCPOFFER message is broadcasted from the server (STEP S19).

On the other hand, when the message sent from the host not managed, i.e., the server B, C or D, is received at the step S15, the sent DHCPDISCOVER message is aborted (STEP S16).

Figure 4:
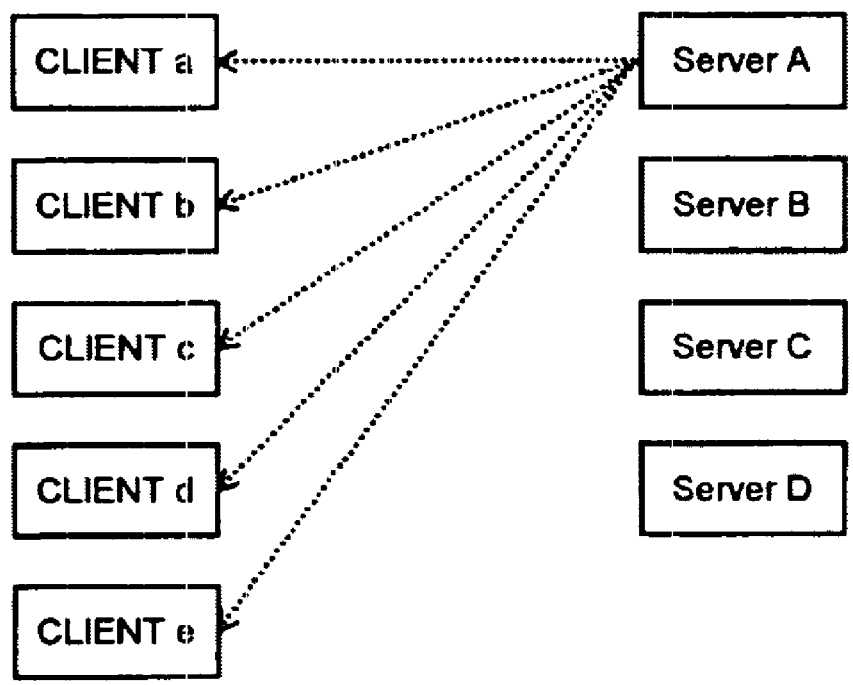
FIG. 4 is a diagram illustrating status when requesting the lease information, i.e., DHCPOFFER message.

At the above-described step S19, as the broadcasted DHCPOFFER message includes a MAC address of the lease information requesting server, the client acknowledges that the message is addressed for the own host according to the MAC address (refer to FIG. 4).

Server Selection

Figure 5:
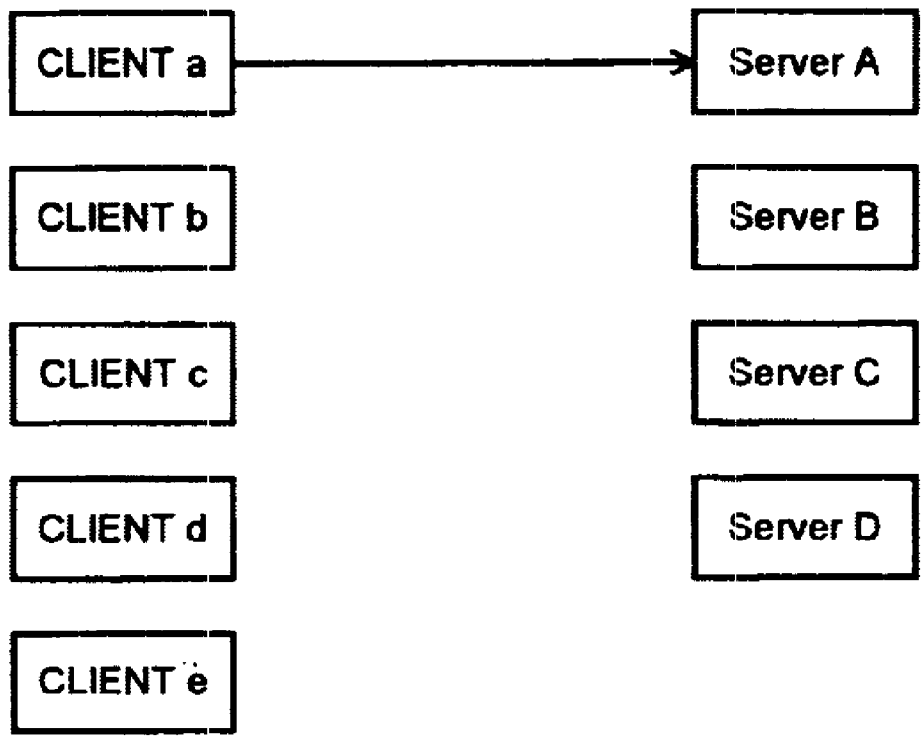
FIG. 5 is a diagram illustrating status when selecting a DHCP server, i.e., DHCPREQUEST message.

The client "a" collects the transmitted DHCPOFFER messages for a constant interval, recognizes from which server the IP address is leased, and sends a DHCPREQUEST message for the server A (refer to FIG. 5).

Acknowledgement from Server

Figure 6:
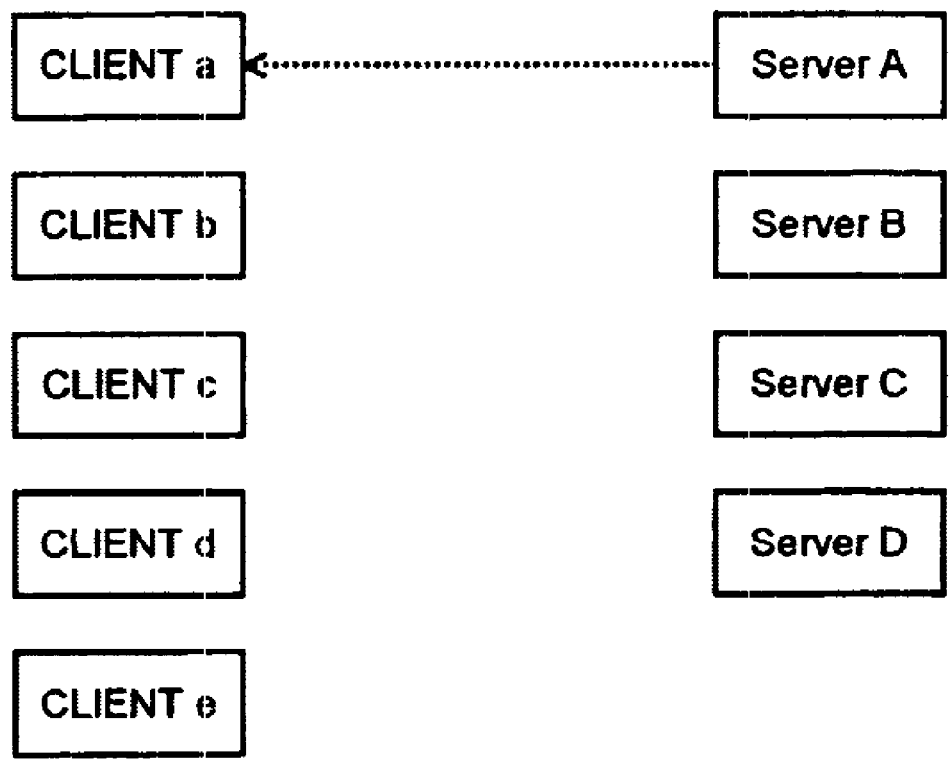
FIG. 6 is a diagram illustrating status when acknowledging from the DHCP server, i.e., DHCPACK message.

Then, the server A receives the DHCPREQUEST message from the client "a" (STEP S20), decides the temporally allocated IP address (STEP S21), and returns a DHCPACK message for the client "a" (refer to FIG. 6).

When the client "a" sends IP address requests two times, error processing should be performed. Then, the IP address becomes inavaliable, and the DHCPACK message is returned (STEP S23).

At the step S20, when the client "a" requests to make it impossible to use the temporally allocated IP address, the temporally IP address allocation is suspended (STEP S24).

In FIG. 10, when the client "a" sends a DHCPRELEASE message, It is finished to use the allocated IP address (STEP S25).

Host Management

In here, two ways how to judge whether or not the sent message is sent from the host managed by the server can be considered.

By referring the host management database managed by the server at two servers, the database becomes duplex, and therefore, it becomes possible to support when a failure occurs at one of the servers.

First is to judge by a host name;

When the received host name of the DHCP client is perfectly coincident with one of the host names set in the host management database 14, the server sends the DHCPOFFER message for the DHCP client (refer to FIG. 8).

Second is to judge by the upper nth character of the host name;

When the upper nth character of the received host name of the DHCP client is coincident with one of the upper nth characters of the host names set in the host management database 14, the server sends the DHCPOFFER message for the DHCP client (refer to FIG. 9).

As is explained above, the DHCP server according to the present invention can reduce a number of broadcasts between DHCP clients and servers only by adding a host management function on the existing DHCP server without any special protocols.

Accordingly, it can be realize to reduce traffics on a TCP/IP network and effectively pay network information out.

The present invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A DHCP server, which allocates IP addresses to a plurality of clients connected to a network, said IP addresses are allocated by using dynamic host configuration protocol (DHCP), the DHCP server comprising:

a host management database for registering host identifiers of the plurality of clients to be managed, wherein when a client broadcasts a lease information request said host management database is checked whether or not a host identifier of the client broadcasting the lease information request is registered in the host management database, a temporarily allocated IP address is broadcasted when the host identifier is checked as registered in the host management database, and when the host identifier is not registered in the host management database, the lease information request having been received from the client is aborted and the DHCP server providing no further response to the client.

2. The DHCP server according to claim 1, wherein the lease information request having been received from the client includes an IP address or a sub-net mask to be obtained.

3. The DHCP server according to claim 1, wherein the host identifier of a client broadcasting a lease information request is compared with registered host identifiers and is confirmed as registered if any one of the registered host identifiers is coincident in entirety to the host identifier of the client.

4. The DHCP server according to claim 1, wherein the host management database stores only a part of a host identifiers for each of the host identifiers of the plurality of the clients as registered data, and checks whether or not the host identifier having been received from the client is coincident in part with any one of the stored parts for the host identifiers of the plurality of the clients.

5. A DHCP server client system comprising:

a plurality of clients; and a plurality of servers, the plurality of clients and the plurality of the servers being connected to a network on a LAN, and an IP address being allocated to each of the plurality of clients by using a dynamic host configuration protocol (DHCP), wherein each of the servers includes a host management database, in which host identifiers of the clients managed by the server are registered, and wherein when a client broadcasts a lease information request said host management database is checked whether or not a host identifier of the client broadcasting the lease information request is registered in the host management database, a temporarily allocated IP address is broadcasted when the host identifier is checked as registered in the host management database, and when the host identifier is not registered in the host management database, the lease information request having been received from the client is aborted and the DHCP server providing no further response to the client.

6. The DHCP server client system according to claim 5,
wherein the lease information request having been received from the client includes an IP address or a sub-net mask to be obtained.

7. The DHCP server client system according to claim 5,
wherein the host identifier of a client broadcasting a lease information request is compared with registered host identifiers and is confirmed as registered if any one of the registered host identifiers is coincident in entirety to the host identifier of the client.

8. The DHCP server client system according to claim 5,
wherein the host management database stores only a part of a host identifier for each of the host identifiers of the plurality of the clients as registered data, and checks whether or not the host identifier having been received the client is coincident in part with any one of the stored parts for the host identifiers of the plurality of the clients.

9. In a system where a plurality of clients and a plurality of servers are connected to a network, and a server allocates an IP address to a client by using a dynamic host configuration protocol (DHCP), an IP address allocating method comprising the steps of:

broadcasting an IP address lease information request including a lease information to the plurality of servers;

checking in servers receiving the IP address lease information request whether or not a host identifier of the client who has sent the IP address lease information request is coincident with one of host identifiers registered in a host management database;

aborting the IP address lease information request and providing no further response to the client when the host identifier sent from the client is not coincident with any one of host identifiers registered in the host management database;

broadcasting a temporarily allocated IP address to the client from a server, which confirms that both of the host identifiers are coincident;

unicasting an IP address request from the client sending the IP address information request to the server broadcasting the temporarily allocated IP address; and unicasting an IP address attaching confirmation to the client having unicasted the IP address request from the server receiving the IP address request.

10. The IP address allocating method according to claim 9,
wherein the lease information request having been received from the client includes an IP address or a sub-net mask to be obtained.

11. The IP allocating method according to claim 9,
wherein the host identifier of a client broadcasting a lease information request is compared with registered host identifiers and is confirmed as registered if any one of the registered host identifiers is coincident in entirety to the host identifier of the client.

12. The IP address allocating method according to claim 9,
wherein the host management database stores only a part of a host identifier for each of host identifiers of the plurality of the clients as registered data, and checks whether or not the host identifier having been received from the client is coincident in part with any one of the stored parts for the host identifiers of the plurality of the clients.

* * * * *